No. 682,771. Patented Sept. 17, 1901.
W. F. WEISS.
FENDER FOR VEHICLES.
(Application filed Dec. 10, 1900.)

(No Model.)

WITNESSES:
Mae Hoffmann
Elizabeth J. Mortimer

INVENTOR:
William F. Weiss
BY
ATTORNEY

THE NORRIS PETERS CO., PHOTO-LITHO., WASHINGTON, D. C.

UNITED STATES PATENT OFFICE.

WILLIAM F. WEISS, OF CAMDEN, NEW JERSEY, ASSIGNOR TO THE UNITED STATES FENDER COMPANY, OF NEW JERSEY.

FENDER FOR VEHICLES.

SPECIFICATION forming part of Letters Patent No. 682,771, dated September 17, 1901.

Application filed December 10, 1900. Serial No. 39,305. (No model.)

*To all whom it may concern:*

Be it known that I, WILLIAM F. WEISS, a citizen of the United States, residing in the city of Camden, in the county of Camden and State of New Jersey, have invented a new and useful Fender for Vehicles, of which the following is a specification.

My invention relates to fenders for vehicles, my object being to afford improved means for holding the front edge of the fender normally above the surface of the ground, but adapted to permit the same to descend to the ground upon its encountering an obstacle, so as to prevent the obstacle from getting beneath the fender, and also when the obstacle falls within or against the network of the fender the front end will be caused to rise again from the ground, so as to carry the obstacle freely over the same.

Figure 1:
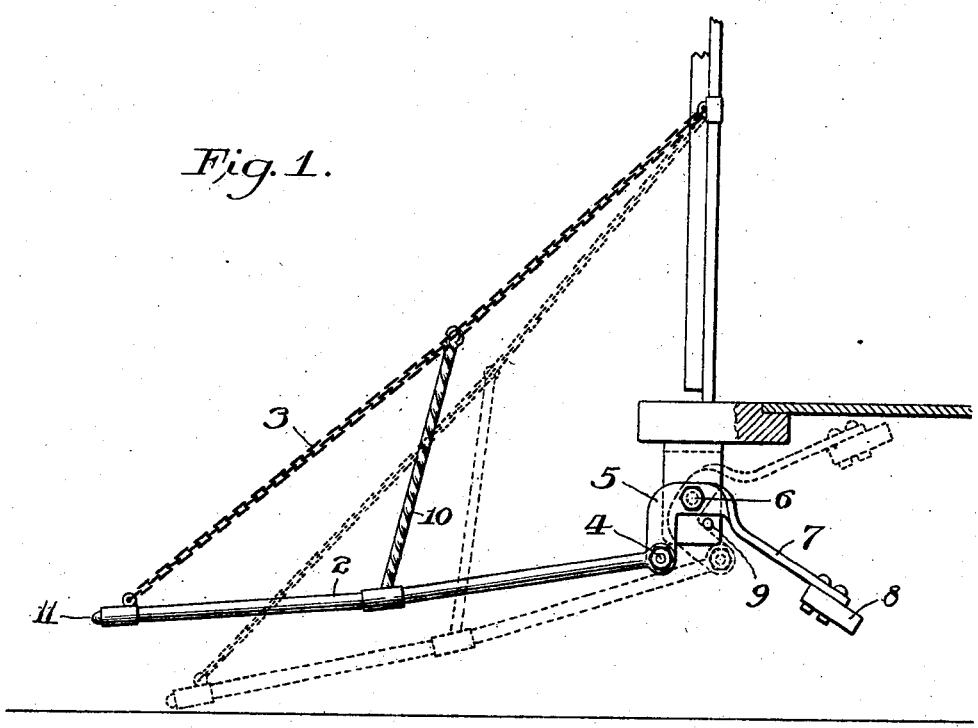
Figure 2:
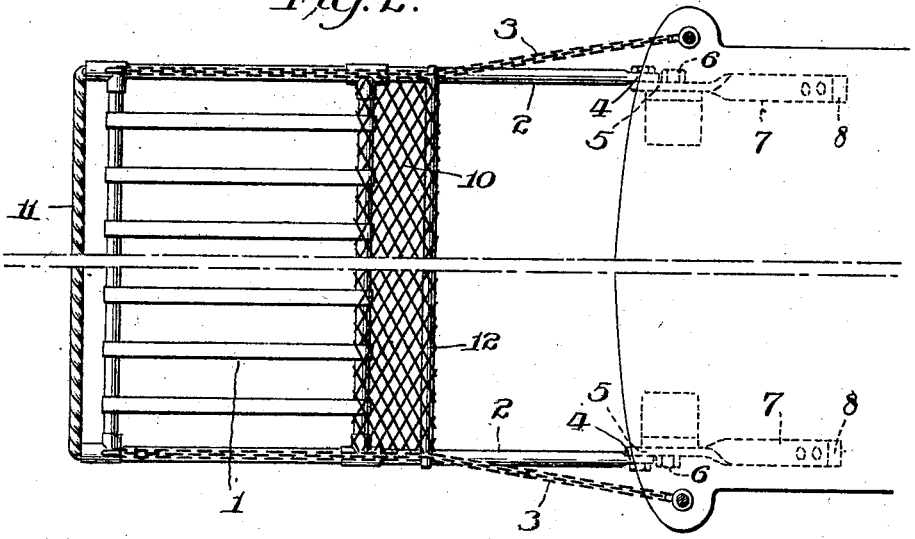

Referring to the drawings, Figure 1 is a side elevation of my device in normal operative position, the dotted lines indicating the position it assumes upon encountering an obstruction. Fig. 2 is a plan view of my device.

Similar numerals refer to similar parts throughout both views.

The slatted approximately horizontal portion 1 of the fender is supported by the rearwardly-extending side rods 2, which are supported at their front ends by the chains 3, connected by the dasher-posts of the car. The rear ends of the rods 2 are pivotally secured at 4 to the members 5, which in turn are pivotally secured at 6 to the car. Extending beyond the pivot securing the member 5 to the car is the arm or extension 7, to the extreme end of which is secured the heavy weight or counterbalance 8. The stop 9 is adapted to limit the backward movement of the front part of member 5. From the rear of the slatted portion 1 of the fender is the inclined portion 10, which consists of a preferably rope network or meshing supported at its upper edge to the cross-bar 12, which is secured to the chains 3. When an obstacle is encountered by the horizontal member 1, which is preferably further protected by the yielding guard-rope 11, the same is forced backward, causing the weights of the counterbalanced members 5 to ascend, thereby permitting said front edge of the fender to descend to the ground to prevent the obstacle from getting beneath it. Upon the obstacle passing said front edge and falling upon the slats of said front member and the rope mesh 10 the weights 8 of member 5 descend and force the front of fender forward and upward, so as to carry the obstacle free from the ground until the vehicle can be stopped.

I do not wish to be confined to the specific construction shown, as modifications may be made without departing from the spirit of my invention.

What I claim is—

1. A vehicle-fender having a flexible support for its front edge and a counterweighted translative pivotal support for its rear, substantially as described.

2. A vehicle-fender having counterweighted means for normally carrying the fender above the ground but permitting the downward movement of its front edge upon engaging with an obstacle, substantially as described.

3. A vehicle-fender having flexible means for supporting its front edge and counterweighted means for normally carrying the fender above the ground but permitting its downward movement of the front edge upon its engaging with an obstacle, substantially as described.

4. In combination with a vehicle-fender, counterweighted means for movably connecting the fender with the vehicle, consisting of a member rotatably secured to the vehicle having a downward projection from its point of support, the lower extension of which is pivotally secured to the fender, substantially as described.

5. In combination with a fender, flexible means for supporting its lower front edge and its rear upper edge, and counterweighted means for normally carrying the front edge of the fender above the ground and permitting its downward movement upon its engaging with an obstacle, substantially as described.

6. In combination with a fender, flexible means for supporting its lower front edge and its rear upper edge, and pivotal counterweighted means for normally carrying the front edge of the fender above the ground and permitting its downward movement upon its engaging with an obstacle, substantially as described.

7. In combination with a vehicle-fender, flexible means for supporting its front edge and its rear upper edge, and counterbalanced translative means for movably connecting the fender with the vehicle, substantially as described.

8. In combination with a fender having a rearward extension, a counterbalanced member pivotally secured to the vehicle, having a downward extension from its pivot-support movably connected with the rearward extension of the fender, and a rearward extension from its pivot-support provided with a counterweight, substantially as described.

9. The combination of a fender, flexibly supported at its front edge and having a rearward extension, a counterbalanced member pivotally secured to the vehicle-body and movably connected with said rearward extension, and a stop adapted to encounter said counterbalanced member to limit its pivotal movement, substantially as described.

10. The combination of a fender, flexibly supported at its front edge, and having a rearward extension, a counterbalanced member pivotally secured to the vehicle having a downward extension from its pivot-support, said downward extension being movably connected with the rearward extension of the fender, and a stop adapted to engage with said downward extension to limit its rearward movement, substantially as described.

11. The combination of a fender having flexible means for supporting its front edge and a rearwardly-extending arm, a counterbalanced member pivotally secured to the vehicle and movably connected with the rearwardly-extending arm and a stop to limit the upward movement of the counterweight, substantially as described.

12. In combination with a fender flexibly supported at its front edge and having a rearward extension, a counterweighted member rotatably connected with the vehicle, and movably connected with the rearward extension of the fender so arranged and disposed as normally to hold it above the ground but adapted to permit the front edge to descend upon encountering an obstruction and a stop to limit the downward movement of the front edge, substantially as described.

13. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle, substantially as described.

14. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle adapted to carry the fender normally above the ground but to permit its front edge to descend upon encountering an obstacle, substantially as described.

15. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle, substantially as described.

16. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle, consisting of a member rotatably secured to the vehicle having a downward projection from its point of support movably connected with the fender, substantially as described.

17. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle, substantially as described.

18. The combination with a vehicle of a fender having an approximately horizontal forward portion and a rear inclined portion, flexible means for supporting the lower front edge of the former and the upper rear edge of the latter, rearwardly-extending arms and counterbalanced means for movably connecting the same with the vehicle consisting of members rotatably secured to the vehicle having a downward projection from its point of support movably connected with the rearwardly-extending arms, and rearward projections provided with counterweights, substantially as described.

WILLIAM F. WEISS.

Witnesses:
JNO. STOKES ADAMS,
MAE HOFFMANN.